No. 799,293. PATENTED SEPT. 12, 1905.
J. BAKER.
DETACHABLE SECURING MEANS FOR TIRES.
APPLICATION FILED FEB. 6, 1905.
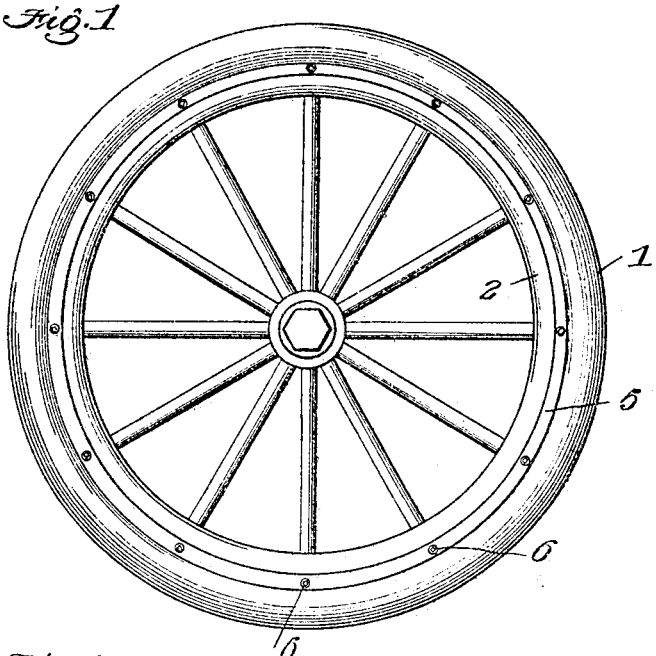
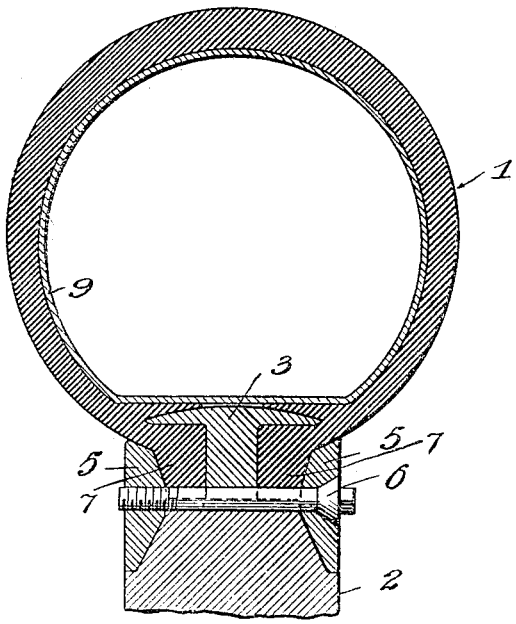
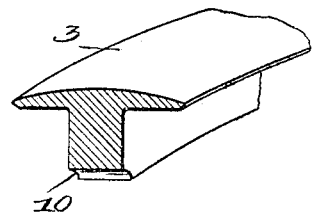
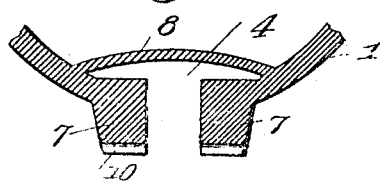
Witnesses
Inventor
John Baker
by Hazard & Harpham
Attorneys

UNITED STATES PATENT OFFICE.

JOHN BAKER, OF PASADENA, CALIFORNIA.

DETACHABLE SECURING MEANS FOR TIRES.

No. 799,293.          Specification of Letters Patent.          Patented Sept. 12, 1905.

Application filed February 6, 1905. Serial No. 244,478.

*To all whom it may concern:*

Be it known that I, JOHN BAKER, a citizen of the United States, residing at Pasadena, in the county of Los Angeles and State of California, have invented new and useful Improvements in Means to Detachably Secure Pneumatic Tires to the Rims of the Wheels, of which the following is a specification.

My invention relates more particularly to means employed to secure pneumatic tires to the wheels of automobiles; and the object thereof is to provide simple and reliable means to detachably secure the pneumatic tire to the rim, so that the same can be easily removed therefrom and can be easily replaced. I accomplish this object by means of the device described herein and shown in the accompanying drawings, in which—

Figure 1 is an elevation of the wheel embodying my invention. Fig. 2 is an enlarged transverse section taken through the tire and the rim. Fig. 3 is an enlarged perspective view of a fragment of the clencher-ring. Fig. 4 is an enlarged fragmentary view of a modified form of a single-tube tire adapted for attachment to the rim by my improved means of attachment.

In the drawings, 1 represents the pneumatic tire secured to the rim 2 by means of my clencher-ring 3, which extends around, when in place, the rim of the wheel. This clencher-ring is T-shaped in cross-section and is adapted for placement in the annular groove 4 (see Fig. 4) of the rubber tire 1. This clencher-ring, when the tire is to be placed on the rim, is first placed in the annular groove 4, the inner perimeter of the ring when in place on the tire forming, with the inner perimeter of the tire, a snug fit on the outside of the rim of the wheel. When the tire and clencher-rings are in place around on the rim, the annular rings 5 are dropped into place in the grooves between the tire and rim, and the binding-bolts or lug-screws are then inserted in openings therefor disposed along the line which divides the rim from the tire, the bolts passing through holes in one ring and are screwed into screw-threaded openings in the other ring by means of a wrench, thereby drawing the rings tightly together and holding the tire rigidly in place on the rim.

In order to prevent the tire from creeping on the rim, I have disposed the holes 10, (see Fig. 3,) through which the bolts 6 pass, centrally on the line dividing the rim and the tire, so that one half of the bolt will be above the center line and the other half below, one half being in the rim and the other half in the tire, preventing the least movement between the tire and the rim. Where the valve-stem passes through the ring into the inner tube, the clencher-ring should be enlarged, that the hole for the valve-stem may not weaken the ring at that point.

When it is desired to remove the tire from the rim, the binding-bolts are removed and the annular rings 5 will drop away, when the tire is easily pulled off the rim.

Thus it will be seen that I have provided a simple and reliable means to hold a pneumatic tire in place on the rim of a wheel. The binding-lugs 7, Fig. 4, on the tire will be tightly held between the clencher-rings and the annular rings 5, and the tire cannot be accidentally removed without breaking the tire or the clencher-ring.

In Fig. 4 I have shown in fragmentary detail the clencher portion of the pneumatic tire, in which it will be seen that I have provided an unbroken web 8, extending over the chamber 4, in which the clencher-ring is placed, and forming thereby a single-tube tire. This will adapt the single-tube tire for placement on the rim by my improved clencher-ring and binding-rings.

In Fig. 2 I have shown a double-tube tire, the inner tube 9 being shown in place therein.

Having described my invention, what I claim as new, and desire to secure by Letters Patent, is—

1. The combination with a rim, a T-shaped clencher-ring and a tire having a groove adapted to receive and conform to the clencher-ring, of annular rings dropped into grooves between the tire and rim and embracing both, and bolts extending through said rings for holding them securely in place against the tire.

2. The combination with a rim, a T-shaped clencher-ring, and a tire having a groove adapted to receive and conform to the clencher-ring, of annular rings dropped into grooves between the tire and rim and embracing both, and bolts extending through said rings for holding them in place against the tire, the rim and clencher-ring having holes on the dividing-line between them, partly in each to receive said bolts whereby the tire is prevented from creeping on the rim.

In witness that I claim the foregoing I have hereunto subscribed my name this 28th day of January, 1905.

JOHN BAKER.

Witnesses:
HENRY T. HAZARD,
MARGARETE C. NICKELESON.